United States Patent Office 3,389,858
Patented June 25, 1968

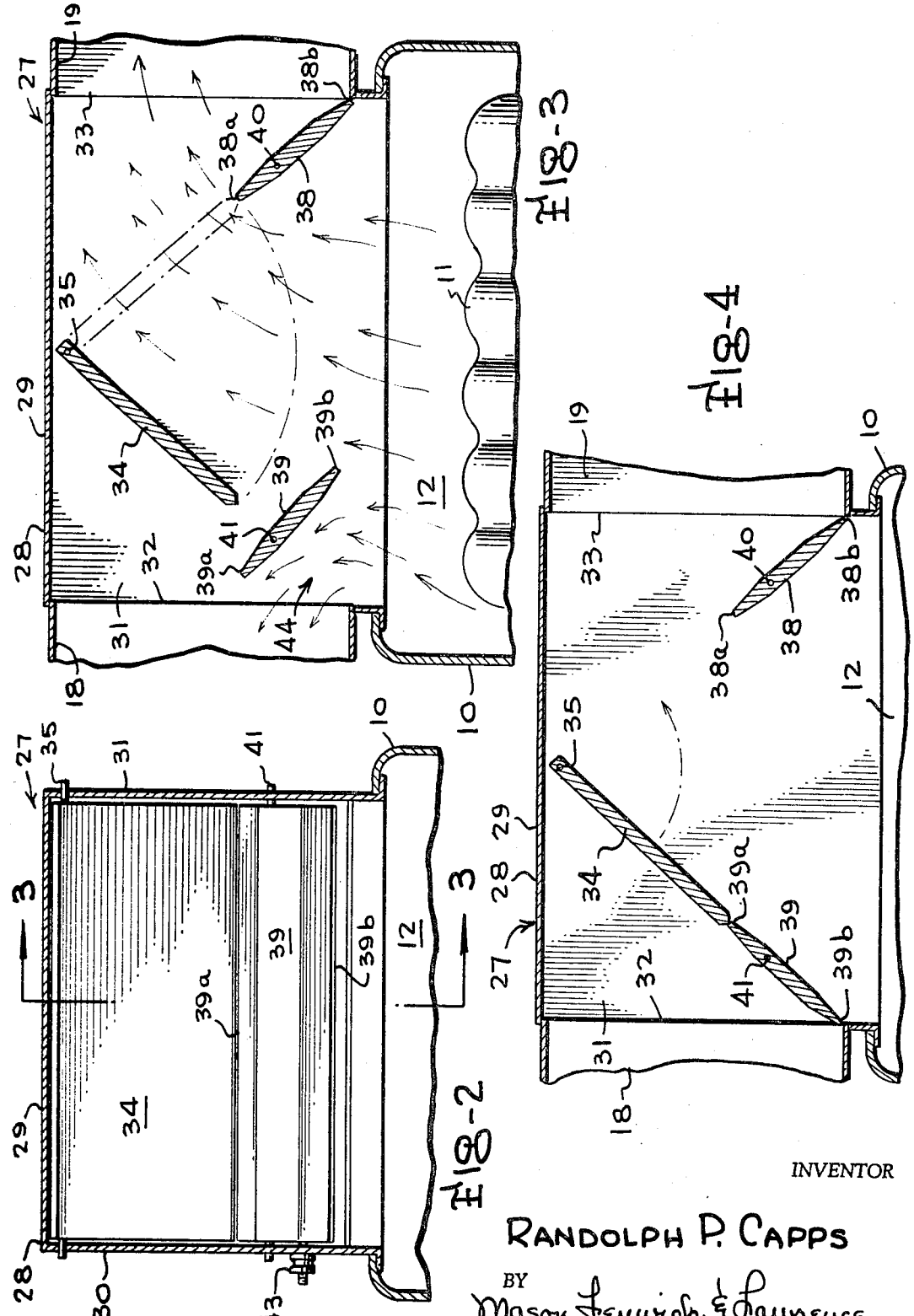

3,389,858
DISTRIBUTING DAMPER ASSEMBLY FOR PLURAL ZONE HEATING
Randolph P. Capps, Lynchburg, Va., assignor to Multi-Zoner, Inc., Lynchburg, Va., a corporation of Virginia
Filed Oct. 14, 1966, Ser. No. 586,816
12 Claims. (Cl. 237—2)

The present invention relates in general to space conditioning systems for serving plural zone space conditioning installations wherein the separate zones may be individually supplied with selected proportions of the conditioning medium during occurrence of demand conditions in the individual zones. More particularly, the present invention relates to such plural zone space conditioning systems having a plenum chamber structure including a distribution damper for selectively directing conditioning medium to any of the plural zones and manually adjustable trim dampers to alter the distribution of conditioning medium that would be produced by the distribution damper for directing a small proportion of conditioning medium to a non-demanding zone when another zone is in demand condition.

Heretofore, space conditioning systems have been devised to selectively direct the output of a source of conditioning medium, such as an air heating furnace, to one or the other of plural zones to be conditioned, responsive to demand or satisfied signals produced by thermostats located in each of the zones to be served. Typical of these is my earlier U.S. patent, No. 3,214,099, granted Oct. 26, 1965, wherein damper means, specifically disclosed in the form of a single distributing damper member located in branched duct portion of the ducting system leading from the furnace to the zones, is driven by a motor to first or second limit positions to direct all the heat output of the furnace to a first or second one of the zones when the thermostat in one of those zones demands heat, and assumes a distributing position supplying the heating medium to both zones when both zones are in demand condition or are in satisfied condition. The control system for the damper means of that patent is such that the damper means is immediately returned to the distributing position whenever one zone which has been demanding heat becomes satisfied, to thereby distribute residual heat in the furnace bonnet to both or all zones during a period of continued operation of the furnace blower following satisfaction of demand conditions until the bonnet temperature descends to a selected blower cut off level or when the furnace blower is operated continuously.

The type of distributing damper arrangement disclosed in my earlier U.S. Patent No. 3,214,099 can be readily employed in heating systems for new construction dwellings and buildings where the pre-installation designing of the ducting system is subject to variation to provide an appropriate branched duct for the distributing damper. However, difficult and expensive revision may be required to adapt the ducting system of already existing heating system installations to receive the distributing damper means as there may be no branched duct between the furnace and the zones to be served and the ducting system may not be readily alterable to provide such a branched duct.

Further, the heat loss properties of the various zones to be served may be such that it is desirable to divert a portion of the heat to a non-demanding zone whenever the damper is positioned to supply heat to a demanding zone to attain improved economy of heating operation, instead of directing all the heat to the demanding zone during a demand condition. As an illustration, in a dwelling having zones A and B to be served, zone A may be of large c.f.m. capacity, for example, constituting the major portion of the house, while zone B may be of quite small capacity such as a recreation room which can handle a c.f.m. capacity which is only part of the total furnace output. In such a case, it would be particularly desirable to divert some of the heated air output of the furnace to zone A when only zone B is demanding and thereby lengthening the period until zone A requires further heating.

Also, in air conditioning systems, it is usually desirable to divert part of the conditioned air to non-demanding zones when the conditioned air source is operating to serve a demanding zone, to thereby maintain more efficient and effective air conditioning of the whole dwelling and reduce noise problems.

An object of the present invention, therefore, is the provision of a novel chamber construction for a distributor damper, which is readily adapted to prefabrication in a factory and to be assembled directly on a furnace or central air conditioning unit for convenient control of distribution of conditioned air to duct sections leading to plural zones to be served.

Another object of the present invention is the provision of a novel prefabricated plenum chamber unit housing distributing damper means, to be surmounted on a furnace or air conditioning unit, between the latter and duct portions leading to separate zones to be served, which is readily adjustable to meet a wide variety of installation conditions and variations in zone capacities.

Another object of the present invention is the provision of a novel plenum chamber unit as described in the immediately preceding paragraph, wherein a main distributing damper is provided and supplemental dampers are associated with the main distributing damper to vary the distribution of heating or conditioning air to plural separated zones which may be of different capacities.

Another object of the present invention is the provision of a novel distributing damper chamber for heating or conditioning systems serving plural separated zones, wherein adjustable supplemental dampers are provided in association with a main distributing damper to scoop a proportion of heated or conditioned air into the ducting portions leading to a larger zone which is not demanding conditioned air while conditioned air is being supplied to a smaller demanding zone.

Other objects, advantages, and capabilities of the present invention will become apparent from the following detailed description taken in conjunction with the accompanying drawings illustrating a preferred embodiment of the invention.

In the drawings:

FIGURE 2 is a section view, to enlarged scale, of the plenum chamber unit, taken along the line 2—2 of FIGURE 1;

FIGURE 3 is a section view of the plenum chamber unit, taken along the line 3—3 of FIGURE 2, showing the supplemental dampers adjusted for use with two zones of unequal capacity; and FIGURE 4 is a section view similar to FIGURE 3, with the supplemental dampers adjusted for use with zones of approximately equal capacity.

Figure 1:
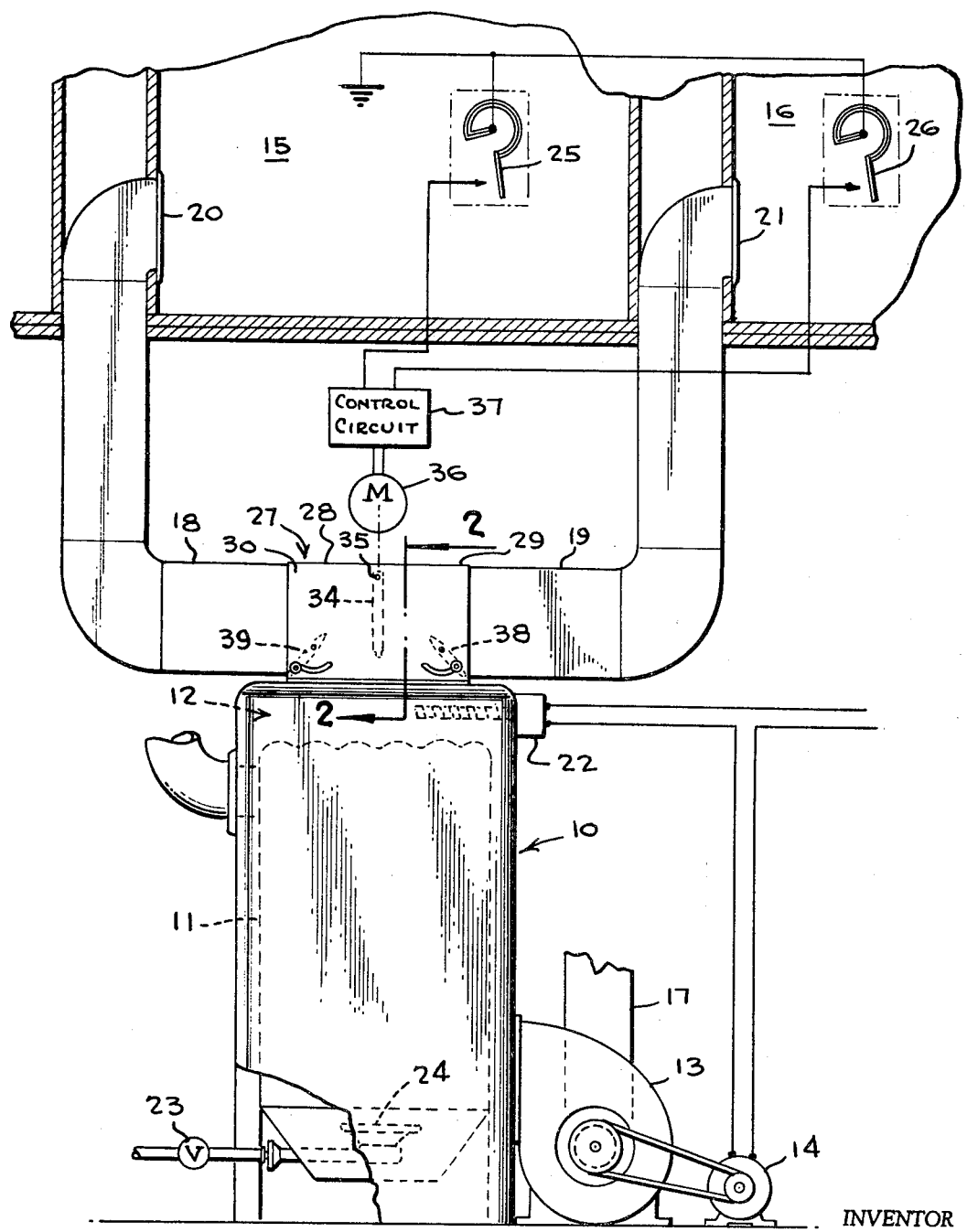
FIGURE 1 is a diagrammatic illustration of a plural zone space conditioning system including a distributing damper chamber unit embodying the present invention shown in side elevation, with dampers therein indicated diagrammatically in broken lines.

In the accompanying drawings, the invention is illustrated in conjunction with a hot air heating system, it being understood that the present invention may be applied with equal facility to air conditioning or other air handling systems.

Referring to the drawings, wherein like reference characters designate corresponding parts throughout the several figures, and particularly to FIGURES 1, 2 and 3, there is illustrated a furnace 10 of generally conventional construction having the usual fire-box or combustion chamber 11 surrounded on the sides and at the top by a bonnet or air chamber 12, through which air is conveyed in heat exchange relation with the fire-box 11 by a conventional blower 13 driven by a blower motor 14. The blower 13 withdraws return air from a pair of zones to be served, indicated at 15 and 16, through the usual return ducting system, a portion of which is indicated at 17, and conveys the air upwardly through the bonnet or air chamber 12 about the sides of the fire-box 11 to be heated and then discharged through the furnace outlet for delivery to the zones to be served. Assuming a heating system installation wherein a space to be conditioned is divided into two principal zones 15 and 16, main branch air delivery ducts 18 and 19 lead from the region of the furnace 10 to the separate zones 15 and 16, and terminate for example, in the usual discharge openings or registers 20 and 21 for discharge of the heated air into the zones.

The blower motor 14 is connected in the usual manner to a source of power through a bonnet switch 22, for example of the thermostatic type, which has preset blower starting and blower cutoff levels and is responsive to temperature in the bonnet or furnace air chamber 12 to energize the blower motor 14 when the bonnet temperature reaches a first selected elevated temperature and to cut off the blower motor 14 when the bonnet temperature falls below a slightly lower selected temperature level to control blower operation in accordance with bonnet temperature so that the blower is operated only when the air temperature in the bonnet 12 is sufficiently high to produce reasonably efficient heating. The bonnet switch 22, or a separate switch located in the bonnet 12, is also procided to regulate cut-off of the burner regulating valve 23 controlling the supply of fuel to the furnace burner 24 to terminate fuel supply to the burner when the bonnet temperature reaches a selected level above the blower cut-on and cut-off temperature levels, provided the valve 23 has not already been previously closed by some other means.

Operation of the fuel valve 23 to initiate combustion in the furnace is under the control of a pair of temperature responsive devices, such as conventional bi-metal thermostats 25, 26, located respectively in the zones 15 and 16 to sense the temperature level in their associated zones and through suitable control circuits open the fuel regulating valve 23.

The distribution damper assembly of the present invention, indicated generally by the reference character 27, is prefabricated in the form of a generally rectangular, box-like housing or plenum chamber 28 of suitable size and configuration to be surmounted on a conventional furnace 10 in open communication with the top of the furnace air chamber or bonnet 12 and with the inlet ends of the branch air delivery ducts 18 and 19. The distributor damper chamber 28 in the exemplary embodiment herein illustrated may be formed of sheet metal by techniques similar to those used in the conventional production of air delivery ducts, and comprises a top panel 29, a pair of depending parallel side panels 30 and 31, and a pair of depending end panels 32, 33, shaped to form a downwardly opening box, the lower edges of the side panels 30 and 31 and end panels 32, 33 being adapted to be fixed in any suitable fashion to the top of the furnace 10 in sealed relation thereto, for example at the lateral and transverse edges of a rectangular opening in the top of the furnace 10 corresponding substantially to the horizontal cross-sectional configuration and size of the top panel 29.

In a satisfactory embodiment of the plenum chamber 28, the side panels 30, 31 would normally be constructed of heavier gauge sheet metal than the top panel 29 and end panels 32, 33, with the top and end panels being formed of a lighter gauge wrapper sheet bent to extend along the upper horizontal edge and the two vertical edges of each of the side panels 30, 31, and suitably secured to these side panel edges as by welding. Branch duct 18 may then be connected to the chamber 28 by cutting a round or rectangular hole of the same shape as the cross-sectional configuration of branch duct 18 in either the end panel 32 or in that half of the top panel 29 lying between its longitudinal center and end panel 32 and joining the inlet end of branch duct 18 to the bounding edges of such opening in sealed relation against loss of air. Branch duct 19 may be connected in a similar manner to a hole cut in end panel 33 or in the half of top panel 29 lying between its longitudinal center and end panel 33.

A distributing damper 34 is supported within the chamber 28 on a transverse horizontal pivot shaft 35 located near the top panel 29 substantially in the vertical plane through the center of the chamber 28 for movement from a normal distributing or intermediate position depending directly downwardly from the pivot shaft 35 substantially in said vertical center plane to a first limit position, illustrated in solid lines in FIGURE 3, directing the heated air primarily to zone 16, or to a second limit position illustrated in broken lines in FIGURE 3 predominately directing the heated air to the zone 15. The distributing damper 34 serves the same function as the damper 26 disclosed in my earlier U.S. Patent No. 3,214,099 and is controlled in the same manner as disclosed in said earlier patent by a damper control motor 36 mechanically linked to the pivot shaft 35 and a control circuit 37 controlling the motor 36.

The control circuit 37, as disclosed in detail in my earlier patent, is such that when the thermostat 25 or 26 for either of the zones 15 or 16 signals that the associated zone demands heat, the motor 36 is energized to drive the distributing damper 34 to the appropriate one of the limit positions (for example, the solid line position illustrated in FIGURE 3 if zone 16 demands heat) so as to direct the heated air conveyed from the furnace through the damper chamber 28 into the branch air delivery duct, for example the duct 19, supplying the demanding zone. When the zone which has been demanding heat becomes satisfied, the thermostat in that zone then supplies a satisfied signal to the control circuit 37, immediately activating the damper motor 36 to drive the distributing damper 34 to the intermediate or distributing position. The arrival of the satisfied signal at the control circuit 37 will also close the fuel supply valve 23 terminating combustion in the fire-box 11 of the furnace, unless combustion has already been terminated by attainment of the high limit temperature in the furnace air chamber 12. In either event, the blower 13 will still be operating since the temperature in the furnace air chamber 12 will be above the lower cut-off temperature level of the bonnet switch 22 and accordingly the residual heated air in the furnace air chamber 12 will be distributed to both zones due to the repositioning of the damper 34 in the intermediate or distributing position, until the blower motor 14 is de-energized by reduction of the furnace air chamber temperature to the blower cut-off temperature level. Of course, if both zones simultaneously demand heat, the distributor damper 34 will remain in the intermediate or distributing position while the burner and blower go through their heating and air distributing cycles, to distribute heat to both zones, and if one zone begins to demand heat while the damper 34 is at a limit position supplying another zone, the damper 34 will be immediately driven to the intermediate or distributing position to thereafter distribute heat to both zones.

The specific forms described in my said earlier patent, presuming zones of comparable capacity, contemplate limit positions for the distributing damper which direct substantially all the conditioned air to the demanding zone.

It is not at all unusual in a plural zone heating system, however, for one of the zones to be of much greater capacity than the other zone. For example, it is not uncommon for one of the zones to constitute the major portion of the house and the other zone to be of relatively small volume, such as the recreation room of the house. In such a case, the furnace should be designed so that its output is adequate for the capacity of the larger size zone or of the whole house. As a specific example, the furnace may be designed to produce an output of 1500 c.f.m. appropriate to the capacity of the whole house or the major portion thereof constituting zone 15, and the zone 16 may be the recreation room which could handle only 500 c.f.m. In such a case, significant improvements in efficiency would be attained if some proportion of the heated air output of the furnace were diverted into the larger zone 15 during the period when the distributor damper 34 is in the appropriate limit position to direct air to the smaller capacity zone 16. To adapt the distributing damper chamber assembly 27 to meet this condition, supplemental balancing dampers or trim dampers 38 and 39 transversely spanning the width of the damper chamber 28 are provided in the lower regions of the chamber 28 adjacent the opposite ends 32, 33 thereof.

These supplemental balancing dampers 38, 39 are of generally planiform vane-like construction having opposite parallel edges 38a, 38b, and 39a, 39b, and are pivoted eccentrically of their centers on horizontal pivot shafts 40 and 41 located nearer the upper edges 38a, 39a. The pivot shafts 40 and 41 are disposed in parallelism with the pivot shaft 35 of the distributing damper 34, and support the dampers 38, 39 in the lower end regions of the chamber 28 for angular adjustment about a selected closed position locating the dampers 38, 39 in upwardly converging planes intersecting the distributing damper pivot shaft 35, wherein the dampers 38, 39 serve as air baffles coacting with the damper 34 to prevent air flow therethrough into the associated branch ducts 19, 18 at the limit positions of damper 34. For example, the pivot shafts 40, 41 may be located relative to the lower corners of side panels 30, 31 to dispose the lower edges 38b, 39b in light contact with the edges of the top opening in the furnace which parallel the pivot shaft 35 when the dampers 38, 39 are in said closed position, or in light contact with the end panels 32, 33 below the openings for the branch ducts, with the dampers 38 and 39 lying in the extended plane of the distributor damper 34 at its respective limit positions for zone 15 demand and zone 16 demand, respectively, the upper edges 38a, and 39a of the distributor dampers lightly touching the free edge of the distributor damper 34 at those limit positions to substantially seal off heated airflow through the aligned damper 34 and balancing damper 38 or 39.

However, the balancing dampers 38, 39 are independently manually adjustable about their pivot shafts 40, 41, for example, by means of clamp nut extensions 43 projecting from the respective balancing dampers through arcuate slots in one of the side panels 30, 31 to permit angular adjustment of the balancing dampers to desired positions from externally of the damper chamber unit 28. This permits angular adjustment of, for example, the balancing damper 39 adjacent the inlet to the branch air delivery duct 18 serving the assumed larger capacity zone 15 at a position as illustrated in FIGURE 3 wherein the radially longer, lower portion of the damper 39 (that portion between the pivot shaft 41 and lower edge 39b) converges downwardly and inwardly toward the center of the fire-box 11. As will be seen from FIGURE 3, this disposition of the damper 39 spaces its upper edge 39a away from the path of the lower edge of distributor damper 34 so that the latter cannot seal off the entrance to branch duct 18 when the damper 34 assumes the solid line limit position illustrated in FIGURE 3. This disposition of damper 39 also spaces the lower edge 39b away from the adjacent corner of the side panels 30, 31 and from the associated edge of the opening in the top of the furnace 10, or away from the end panel 32, providing a space 44 between the balancing damper 39 and the adjacent corner of the chamber 28 through which heated air rising from the furnace air chamber 12 is channeled into the branch duct 18 serving zone 15 even though the distributor damper 34 may be disposed at the limit position appropriate for demand of heat by zone 16 only. This disposition of the balancing damper 39 effectively scoops some of the heated air out to zone 15 even though the main damper 34 is in the position normally appropriate to close off this supply of heated air to zone 16. The particular angular adjustment of the balancing damper 39 may be made appropriate so as to divert such portions of the heated air into the non-demanding zone 15 when zone 16 only is demanding heat, as would represent the surplus capacity of the furnace relative to the capacity of the smaller demanding zone. This not only improves the efficiency of the operation, but avoids excessive duct velocities and noise problems in the smaller zone. The other supplemental balancing damper 38 is similarly adjustable to provide selected bleeding of air into its associated duct 19 as conditions may require.

Also, in air cooling installations, it is usually desirable to effect only partial closure of the ducting branch leading to a non-demanding zone when the system is operating to supply conditioned medium to a demanding zone, so as to maintain some minimum circulation in at all times in non-demanding zones. The construction of the distributor damper chamber assembly 27 described above is extremely versatile and adapts itself well to the many installation conditions that may be encountered for heating systems, cooling systems, or combinations heating and cooling systems, in that it permits a wide variety of adjustment of the balancing dampers 38, 39 to provide for a wide range of partial or complete closure conditions at the limit positions of the main distributor damper, in accordance with whatever conditions may be found to be required for a particular heating or cooling system installation. The herein above-described construction permits the provision of a standardized, factory constructed unit which can be surmounted on the conventional furnace, and to which the branch air delivery ducts to the zones to be served can be connected to provide the various types of operation herein described, without having to custom produce a damper system for the particular heating or cooling conditions which may be encountered.

While only one form of the present invention has been particularly shown and described, it will be apparent that various modifications may be made within the spirit and scope of the invention, and it is desired, therefore, that only such limitations be placed on the invention as are imposed by the prior art and set forth in the appended claims.

What is claimed is:

1. In a temperature control system for a building having first and second zones, temperature changing means for supplying a temperature conditioned medium to said zones, a duct system including first and second branch duct means associated with the first and second zones respectively, for conveying said medium to said zones, a thermostat in each of said zones for producing demand signals when the air temperature in its associated zone is in selected temperature ranges, blower means for circulating said medium through said duct means to said zones, and zone distributing means in said duct system controlled responsive to said signals to assume first and second zone positions directing said medium predominantly to the first and second branch duct means respectively when their associated thermostats separately produce demand signals and to assume a distributing position supplying both branch duct means when both zone thermostats are concurrently producing demand signals; the improvement wherein said zone distributing means comprises a damper chamber communicating with said temperature changing means to receive said medium therefrom and communicating at opposite end portions of said chamber with the respective branch duct means to deliver said medium to each of said zones, a main distributing damper having a free edge movable in a selected arcuate path pivoted for angular movement from said distributing position to said first and second zone positions, and at least one angularly adjustable supplemental damper pivotally supported in said chamber radially outwardly of said arcuate path and disposed adjacent said first zone position of said distributing damper for modifying the distribution of the medium when said distributing damper assumes said first zone position, said supplemental damper being movable between a first position coacting with said main damper at said first zone position to substantially prevent passage of said medium through said chamber to said second branch duct means and a second position spacing said supplemental damper relative to the distributing damper for admitting selected proportions of said medium to said second branch duct means when the distributing damper occupies the first zone position.

2. A temperature control system as defined in claim 1, wherein a second supplemental damper is pivotally supported in said chamber radially outwardly of said arcuate path and adjacent the second zone position of said distributing damper for movement between a first position coacting with said main damper at its second zone position to substantially prevent passage of said medium through said chamber to said first branch duct means and a second position spacing said second supplemental damper relative to said distributing damper for admitting selected proportions of said medium to said first branch duct means when the distributing damper occupies the second zone position.

3. A temperature control system as defined in claim 2 wherein said dampers are each of substantially planiform configuration, said supplemental dampers being disposed in the extended plane of said distributing damper at the first and second zone positions of the latter when occupying said first position with the edges of said supplemental dampers adjacent the free edge of said distributing damper conforming to the configuration of the latter to substantially prevent medium flow therebetween.

4. A temperature control system as defined in claim 1 whrein said dampers are each of substantially planiform configuration, said supplemental damper being disposed in the extended plane of said distributing damper at the first zone position of the latter when occupying said first position with the edge of said supplemental damper adjacent the free edge of said distributing damper conforming to the configuration of the latter to substantially prevent medium flow therebetween and said supplemental damper in said second position being disposed in a plane inclined to and intersecting said extended plane of the distributing damper at the first zone position of the latter.

5. A temperature control system as defined in claim 4, wherein said damper chamber has a generally rectangular lower opening for passage of said medium into said chamber from said temperature changing means, said supplemental damper being disposed adjacent one edge of said opening adjoining said second duct means and being of generally rectangular configuration having an upper edge substantially conforming to the free edge of said distributing damper and a lower edge substantially conforming to said one edge of said opening, the pivot axis of said supplemental damper being located between said upper and lower edges and said upper and lower edges being spaced to span the distance between said one edge of said opening and the free edge of said distributing damper when the latter occupies said first zone position.

6. A temperature control system as defined in claim 1, wherein said damper chamber has an opening at the bottom thereof communicating with said temperature changing means for passage of said medium upwardly from the latter into said chamber, and said supplemental damper vertically overlies part of said opening adjacent a bounding edge of the opening at a location whereby the supplemental damper in said second position is disposed in downwardly and inwardly inclined relation spaced from said bounding edge and lying in the path of some of said medium passing upwardly through said opening to deflect part of the upwardly rising medium through the space between said supplemental damper and said bounding edge into said second branch duct means.

7. A temperature control system as defined in claim 2, wherein said damper chamber includes a substantially box-like housing in open communication along a first plane with said conditioning means to receive medium therefrom and in open communication with said first and second branch duct means along second and third parallel planes substantially perpendicular to said first plane, said distributing damper being pivoted about a transverse axis paralleling and centered between said second and third planes for angular movement to said first and second zone positions wherein said distributing damper lies in inclined planes through said axis and directed toward the intersections of said second and third planes with said first plane, and said supplemental dampers being located between said second and third planes adjacent said intersections and disposed in said inclined planes spanning the distance between said free edge and said intersections when said supplemental dampers occupy said first position.

8. In a temperature control system for a building having first and second zones, a furnace for supplying heated air to said zones including a bonnet chamber extending into the top portion thereof in which air is heated, a duct system including first and second branch duct means associated with the first and second zones respectively for conveying said heated air to said zones, a thermostat in each of said zones for producing demand signals when the air temperature in its associated zone is below selected temperature levels, blower means for circulating said heated air through said duct means to said zones during operation of the furnaces and for a selected period thereafter, and zone distributing means in said duct system controlled responsive to said signals to assume first and second zone positions directing said heated air predominantly to the first and second branch duct means respectively when their associated thermostats separately produce demand signals and to assume a distributing position supplying both branch duct means when both zone thermostats are concurrently producing demand signals and to also assume said distributing position immediately following termination of demand signals for a single zone without interrupting operation of said blower means; the improvement wherein said zone distributing means comprises a damper chamber surmounted on said furnace and communicating therewith to receive said heated air therefrom and communicating at opposite end portions of said damper chamber with the respective branch duct means to deliver said heated air to each of said zones, a main distributing damper having a free edge movable in a selected arcuate path pivoted about a horizontal axis for angular movement from said distributing position to said first and second zone positions, and a pair of angularly adjustable supplemental dampers respectively associated with said first and second duct means pivotally supported in said damper chamber radially outwardly of said arcuate path and respectively disposed adjacent said zone positions of said distributing damper for modifying the distribution of the heated air when said distributing damper assumes said zone positions, said supplemental dampers being each movable between a first position coacting with said main damper at said zone positions to substantially prevent passage of said heated air through said damper chamber to their associated branch duct means and a second position spacing said supplemental dampers relative to the distributing damper for admitting selected proportions of said heated air to their associated branch duct means when the distributing damper occupies a zone position to direct air to the opposite branch duct means.

9. A temperature control system as defined in claim 8, wherein said supplemental dampers have upper and lower parallel edges located above and below the pivot axis therefor, said damper chamber has a lower opening communicating with said bonnet chamber for passage of heated air upwardly therethrough into said damper chamber, and said supplemental dampers overlie portions of said lower opening adjacent the opposite edges thereof and span the distance between their associated opposite edges of said lower opening and the arcuate path of the free edge of said distributing damper when said supplemental dampers occupy their first positions.

10. A temperature control system as defined in claim 9, wherein said supplemental dampers when in their second positions are inclined downwardly and inwardly of said lower opening in the path of heated air rising through said opening to deflect such heated air between said supplemental dampers and the respective adjacent edges of said lower opening and into their associated branch duct means.

11. In a temperature control system for a building having first and second zones, temperature changing means for supplying a temperature conditioned medium to said zones, a duct system including first and second branch duct means associated with the first and second zones respectively, for conveying said medium to said zones, a thermostat in each of said zones for producing demand signals when the air temperature in its associated zone is in selected temperature ranges, blower means for circulating said medium through said duct means to said zones, and zone distributing means in said duct system controlled responsive to said signals to assume a plurality of selected positional states including first and second zone states directing said medium predominantly to the first and second branch duct means respectively when their associated thermostats separately produce demand signals and to assume a distributing state supplying both branch duct means when both zone thermostats are concurrently producing demand signals; the improvement wherein said zone distributing means comprises a damper chamber communicating with said temperature changing means to receive said medium therefrom and communicating at opposite end portions of said chamber with inlets to the respective branch duct means to deliver said medium to each of said zones, pivoted distributing damper means in said damper chamber controlled responsive to said signals for angular movement to said selected positional states, and at least one angularly adjustable supplemental damper pivotally supported in said chamber at the inlet of said second branch duct means for controlling a selected portion of the cross-sectional area of said last-mentioned inlet and coacting with said distributing damper means to collectively regulate admission of the medium to said last-mentioned inlet for modifying the distribution of the medium when said distributing damper means assumes said first zone state, said supplemental damper being movable between a first position coacting with said distributing damper means in said first zone state to substantially prevent passage of said medium through said chamber to said second branch duct means and a second position opening said inlet of said second branch duct means to admit selected proportions of said medium to said second branch duct means when the distributing damper means occupies the first zone state.

12. A temperature control system as defined in claim 11, wherein said damper chamber has an opening at the bottom thereof communicating with said temperature changing means for passage of said medium upwardly from the latter into said chamber, and said supplemental damper in at least said second position vertically overlies part of said opening adjacent a bounding edge of the opening at a location whereby the supplemental damper in said second position is disposed in downwardly and inwardly inclined relation spaced from said bounding edge and lying in the path of some of said medium passing upwardly through said opening to deflect part of the upwardly rising medium through the space between said supplemental damper and said bounding edge into the inlet of said second branch duct means.

No references cited.

EDWARD J. MICHAEL, *Primary Examiner.*